(12) United States Patent
Miyata

(10) Patent No.: US 6,441,826 B1
(45) Date of Patent: Aug. 27, 2002

(54) METHOD AND APPARATUS FOR GENERATING TEXTURES FOR DISPLAY

(75) Inventor: Kazunori Miyata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1243 days.

(21) Appl. No.: 08/918,267

(22) Filed: Jan. 9, 1996

Related U.S. Application Data

(63) Continuation of application No. 08/097,800, filed on Jul. 27, 1993, now abandoned.

(30) Foreign Application Priority Data

Jul. 27, 1992 (JP) ............................................. 4-199623

(51) Int. Cl.[7] .............................................. G06F 3/00
(52) U.S. Cl. ..................................................... 345/582
(58) Field of Search ................................ 345/425, 430; 382/108

(56) References Cited

U.S. PATENT DOCUMENTS

| | | | | | |
|---|---|---|---|---|---|
| 4,586,038 A | * | 4/1986 | Sims et al. | .................. | 395/130 |
| 4,855,934 A | * | 8/1989 | Robinson | ................ | 395/125 X |
| 4,931,953 A | * | 6/1990 | Uehara et al. | ............... | 395/151 |
| 4,985,854 A | * | 1/1991 | Wittenburg | .................. | 395/121 |
| 4,985,855 A | * | 1/1991 | Aldrich et al. | ............... | 345/425 |
| 5,029,225 A | * | 7/1991 | Ueda | ......................... | 395/108 |
| 5,109,479 A | * | 4/1992 | Williams | .................... | 345/425 |
| 5,175,806 A | * | 12/1992 | Muskovitz et al. | ......... | 395/125 |
| 5,179,638 A | * | 1/1993 | Dawson et al. | ............. | 395/125 |
| 5,224,208 A | * | 6/1993 | Miller, Jr. et al. | .......... | 395/130 |
| 5,230,039 A | * | 7/1993 | Grossman et al. | .......... | 395/130 |
| 5,265,197 A | * | 11/1993 | Konod | ........................ | 395/120 |
| 5,333,245 A | * | 7/1994 | Vecchione | ................... | 395/130 |
| 5,361,386 A | * | 11/1994 | Watkins et al. | ............. | 345/430 |
| 5,369,736 A | * | 11/1994 | Kato et al. | .................. | 395/125 |
| 5,381,519 A | * | 1/1995 | Brown et al. | ................ | 395/132 |
| 5,394,516 A | * | 2/1995 | Winser | ........................ | 395/119 |
| 5,410,644 A | * | 4/1995 | Thier et al. | ................. | 345/425 |
| 5,469,535 A | * | 11/1995 | Jarvis et al. | ................ | 345/430 |

OTHER PUBLICATIONS

Siggraph '85, vol. 19, No. 3, Jul., San Francisco, "Solid Texturing of Complex Surfaces", D. R. Peachey, pp. 279–286.
Siggraph '85, vol. 19, No. 3, Jul., San Francisco, "An Image Synthesizer", K. Perlin, pp. 287–296.
*Computer Graphics*, vol. 23, No. 3, Jul., Boston, "Hypertexture", K. Perlin, pp. 253–262.
Foley et al., Computer Graphics: Principles and Practice, 1990, p. 617–646, 667–668, 741–745.*
Heckbert, Survey of Texture Mapping, IEEE CG&A, Nov. 1986, p. 56–67.*

* cited by examiner

*Primary Examiner*—John Breene
(74) *Attorney, Agent, or Firm*—Volel Emile; Bracewell & Patterson, L.L.P.

(57) ABSTRACT

A method and apparatus for providing evaluation values concerning each position within a specified two-dimensional coordinate range for each position coordinate of each line segment. Such evaluation values are accumulated for each position within the two-dimensional coordinate range. Two-dimensional graphics information is provided according to the accumulated evaluation values. In addition, graphics are displayed according to the two-dimensional graphics information. Because information concerning line segments is accordingly separated from information concerning modeling line segments, hand-written input is enabled for information concerning line segments and a preview is enabled to be performed by use of skeleton information.

10 Claims, 5 Drawing Sheets

Modeling by Evaluation Function

Evaluation Function Example 1: Hemisphere

Evaluation Function Example 2: Pyramid

Evaluation Function Example 3: Stain

Determination of Normal Vector

METHOD AND APPARATUS FOR GENERATING TEXTURES FOR DISPLAY

This is a continuation of application Ser. No. 08/097,800, filed Jul. 27, 1993 now abandoned.

TECHNICAL FIELD

This patent document relates to a method and apparatus for generating textures for display.

BACKGROUND ART

Previous texture generating techniques include procedural texture and solid texture techniques. Procedural texture is a technique for generating texture by a function or a combination of several functions. This technique is described in Perlin's articles: "An Image Synthesizer," Computer Graphics, Vol.19, No.3, pp.287–296, 1985; and "Hypertexture," Computer Graphics, Vol.23, No.3, pp.253–262, 1989. Solid texture is a technique for generating texture in three-dimensional space and enables representation of precut materials, such as lumber and marble, that are difficult to represent by two-dimensional texture. This technique is taught in Peachey's article: "Solid Texture of Complex Surfaces," Computer graphics, Vol.19, No.3, pp.279–286, 1985.

These techniques pose the problems of how to input data and how to preview object texture. As to how to input data, the conventional techniques dealt only with mathematical functions. The present invention enables line segments of texture to be defined not only by mathematical functions but also by use of an input device such as a tablet. As to how to preview object texture, conventional techniques have not addressed this matter. Inasmuch as the automatic generation of texture takes some amount of computation time, it is desirable to shorten the time between data input and texture output where texture is generated by trial and error. In these circumstances, substantial labor and time would be saved if an element of preview were introduced. The present invention facilitates this preview by use of line segments as texture feature variables.

DISCLOSURE OF THE INVENTION

The present invention includes enabling basic texture data to be input not only as mathematical functions but also by use of an input device, such as a tablet, and to provide a texture display technique capable of display textural features simply and previewing object texture easily.

In order to achieve the above-mentioned objects, this invention includes the steps of providing an evaluation value for each position within a predetermined two-dimensional coordinate range with respect to each position coordinate of a line segment, accumulating such evaluation values for each position within the two-dimensional coordinate range, providing two-dimensional graphics information on the basis of the accumulated evaluation values, and displaying graphics according to the two-dimensional graphics information. This separation of information about line segments from information about the method of modeling enables use of hand-written input of line segment information and also enables object texture to be previewed by use of skeleton information.

A further understanding of the nature and advantages of the present invention may be realized by reference to the remaining portions of the specification and the drawings.

BEST MODE FOR CARRYING OUT THE INVENTION

Figure 1:
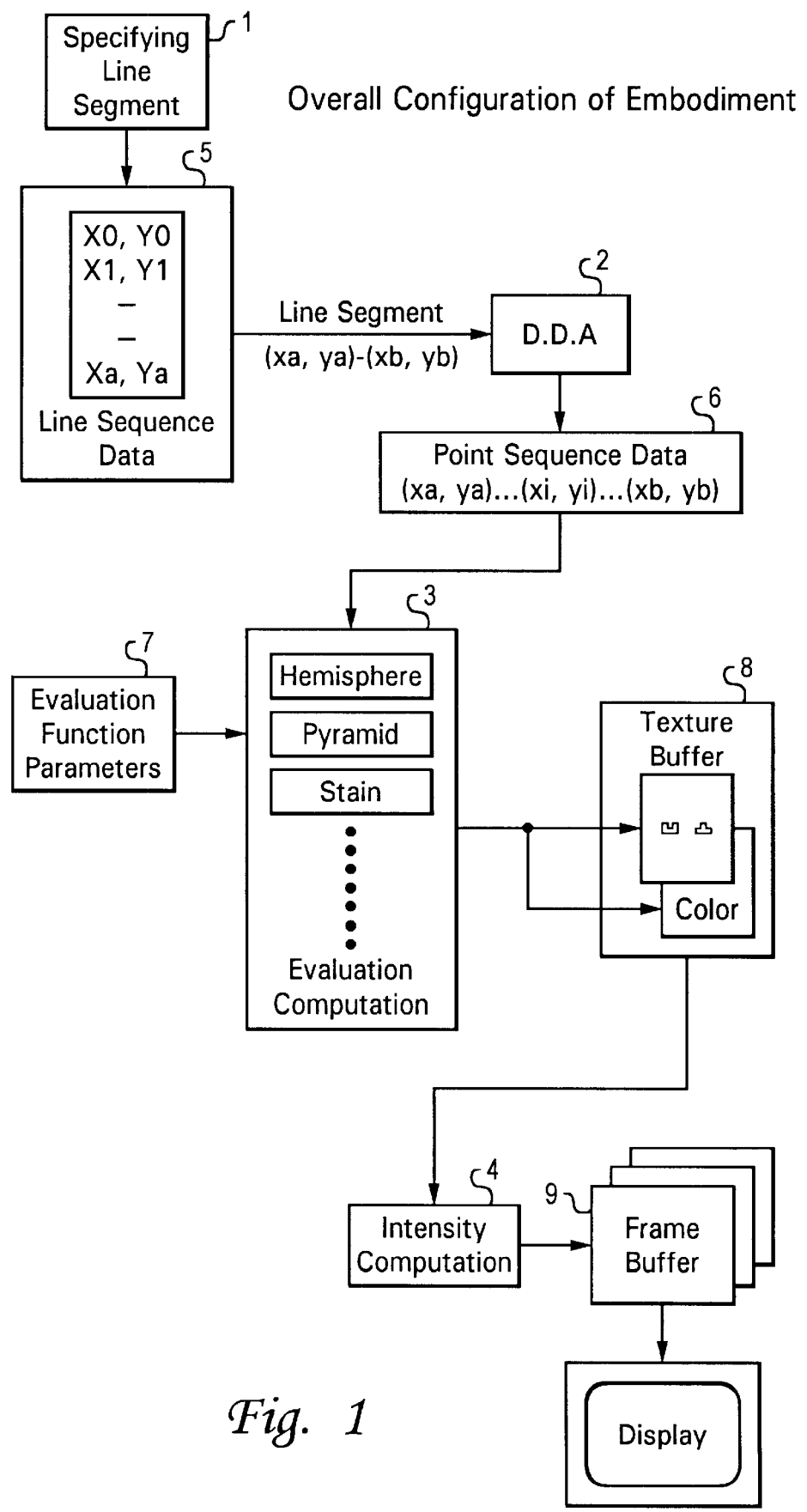
FIG. 1 is a general block diagram of an embodiment of this invention.

FIG. 1 shows an overview of the texture generator according to a preferred embodiment of the invention. This texture generator generates texture by combining line segments as texture feature variables with evaluation functions for modeling the line segments. This generator consists of a line segment specifying block 1, a digital difference analyzer (DDA) block 2, an evaluation computation block 3, and an intensity computation block 4. The inputs/outputs of these blocks include line sequence data 5, point sequence data 6, evaluation function parameters 7, a texture buffer 8, and a frame buffer 9. These are explained in greater detail below. Each block is a module that preferably operates under the control of an IBM RISC System/6000 (a trademark of International Business Machines Corporation), and the inputs/outputs of these blocks occupy an area of the memory space of the IBM RISC System/6000.

The input/output of each block will be described first. The input/output includes line sequence data 5, point sequence data 6, evaluation parameters 7, a texture buffer 8, and a frame buffer 9.

The line sequence data 5 defines each skeleton line representing a texture feature variable. This data is expressed by a two-dimensional coordinate value sequence, $\Sigma(x, y)$, corresponding to the initial or terminal point of each line segment constituting each line segment and the size, N, of the coordinate value sequence. That is, the line sequence data 5 is expressed as an array of size N.

The point sequence data 6 is a coordinate value sequence generated from the line sequence data through a DDA. That is, the point sequence data signifies a point sequence present in each line segment, which is expressed by a two-dimensional coordinate value sequence, $\Sigma(x, y)$ and the size, M, of the coordinate value sequence. That is, the point sequence data 6 is expressed as an array of size M.

The evaluation function parameters 7 are used for functions that model line segments, and provide data proper to each function.

The texture buffer 8 stores generated texture data. The buffer 8 consists of two areas: one stores the bump attributes of texture; the other stores color information. For the bump attributes, it has the surface displacement value at each point. Eight-bit information is provided as color information for each of the three color components, i.e., red (R), green (G), and blue (B). The size of the buffer 8 depends on the size of the specified texture.

The frame buffer 9 stores the result of computing intensity, which will be described later. A storage capacity of eight bits per pixel is required to store color information (R, G, and B). The size of the buffer 9 depends on the size of the specified texture.

The line segment specifying block 1 receives as input a line segment 5 defined by a mathematical function or input by use of graphics input device, such as a tablet.

The digital difference analysis (DDA) performed by the digital difference analyzer block 2 is a widely used technique for rasterizing straight lines. With regard to its operation, refer to Bresenham's article: "Algorithm for Computer Control of a Digital Plotter," IBM System Journal, Vol.4, pp.25–30, 1965. A required point sequence 6 in a straight line, which is not necessarily a point sequence in a straight line in the strict sense of the term because it is rasterized, can be determined by applying the DDA technique.

Figure 2:
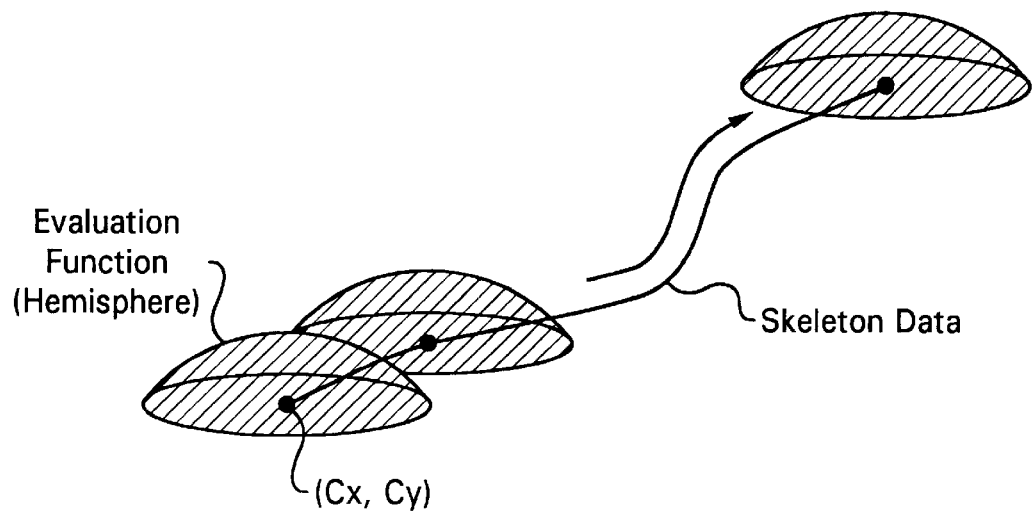
FIG. 2 illustrates the progress of modeling line segments by evaluation functions.

The evaluation functions for modeling line segments performed by the evaluation computation block 3 include the representative examples described below. In modeling line segments by the evaluation functions, the position parameters, cx and cy, of each function shall correspond to each point of a point sequence 6 in a line segment obtained through DDA. FIG. 2 illustrates the progress of modeling line segments by evaluation functions. An evaluation value at each point within an object range is determined for each point of the point sequence, and such evaluation values are accumulated for each point within the object range by use of the texture buffer 8.

Figure 3:
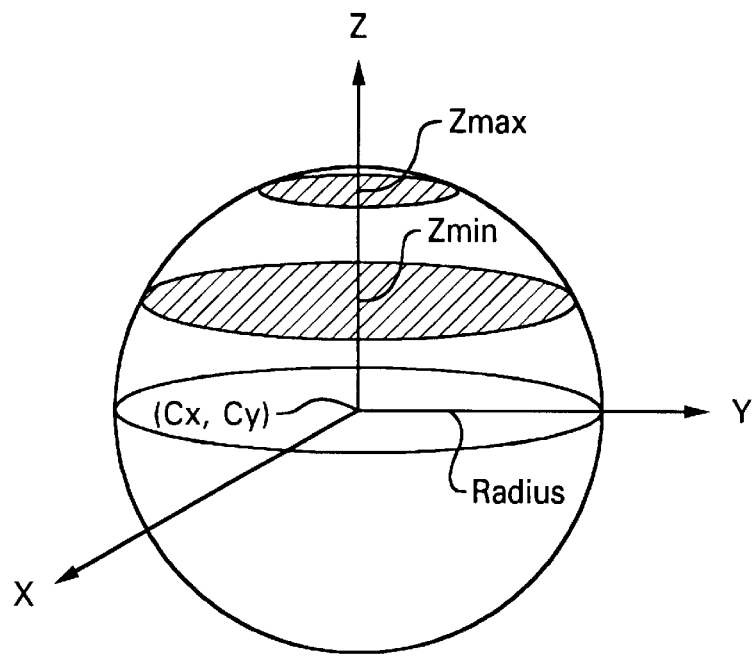
FIG. 3 illustrates an evaluation function for a hemisphere.

FIG. 3 illustrates an evaluation function for a hemisphere with variables cx, cy, zmin, zmax and radius. This evaluation function takes values falling within the range zmin to zmax (zmin<zmax) on the surface of a sphere given by central coordinates (cx, cy, 0) and a radius. If the value of zmin is negative, a concave configuration is obtained, whereas a convex configuration is obtained if it is positive.

Figure 4:
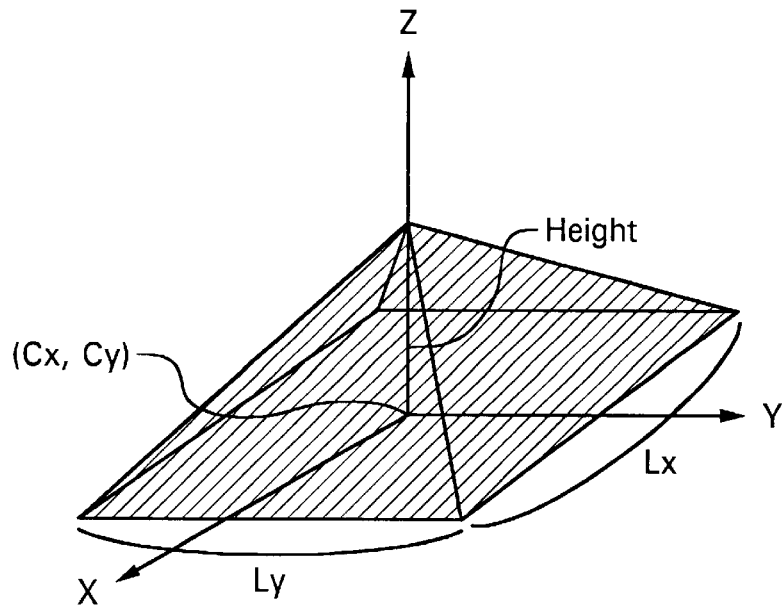
FIG. 4 illustrates another evaluation function for a pyramid.

FIG. 4 illustrates another evaluation function for a pyramid with variables cx, cy, 1x, 1y, and height. This evaluation function takes values on the surfaces of a pyramid whose central coordinates are (cx, cy, 0); whose bottom is a rectangle (1x by 1y); and whose height is h. If the height value is Y negative, a concave configuration is obtained, whereas a convex configuration is obtained if it is positive.

Figure 5:
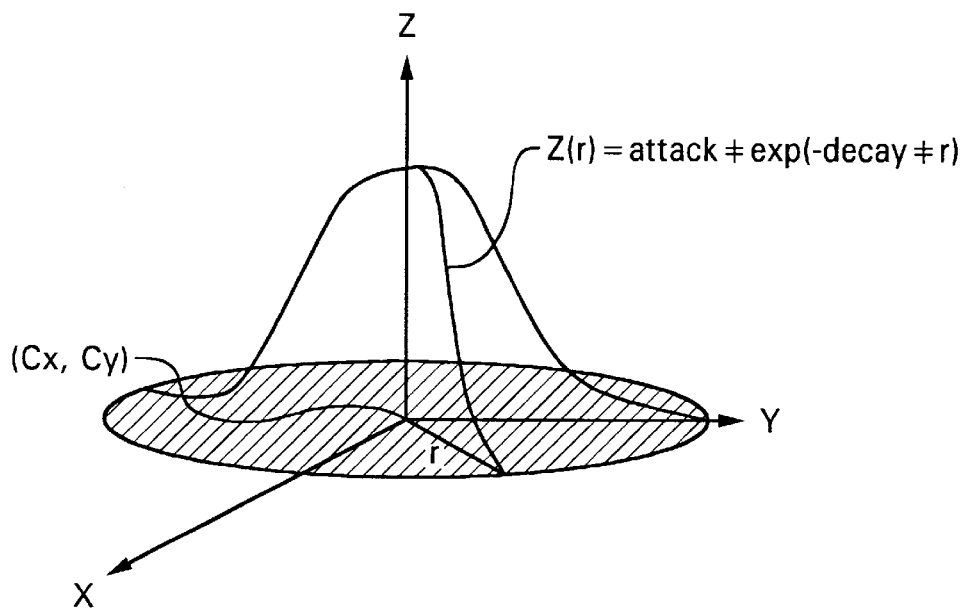
FIG. 5 illustrates another evaluation function for a stain.

FIG. 5 illustrates another evaluation function for a stain with variables cx, cy, attack and decay. This evaluation function takes values on a curved surface formed by rotating the exponential function "Z (r)=attack exp(−decay.r)" around the Z-axis centered at a point (cx, cy, 0). If the value of the attack parameter is negative, a concave configuration is obtained, whereas a convex configuration is obtained if it is positive.

The cumulative totals of evaluation values determined by these functions are stored as bump information in the bump attribute area of the texture buffer 8, or, such cumulative totals obtained are converted into color information, which is then stored in the color attribute area of the texture buffer 8.

Figure 6:
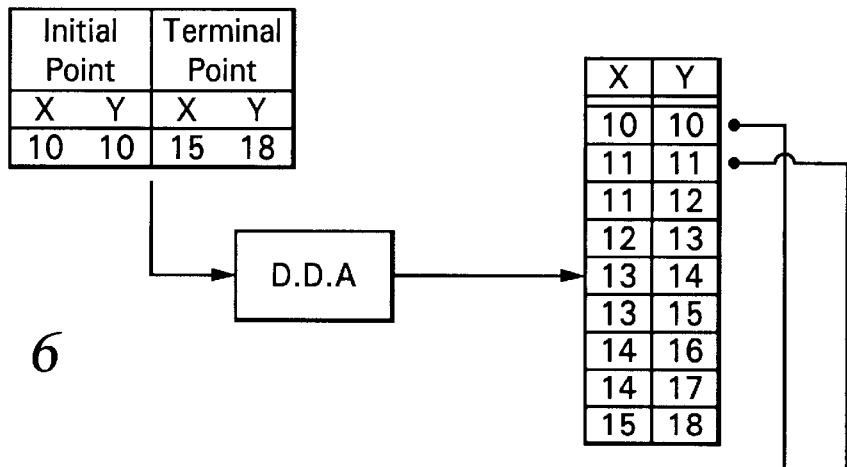
FIG. 6 illustrates a method of modeling by evaluation functions.
Figure 6:
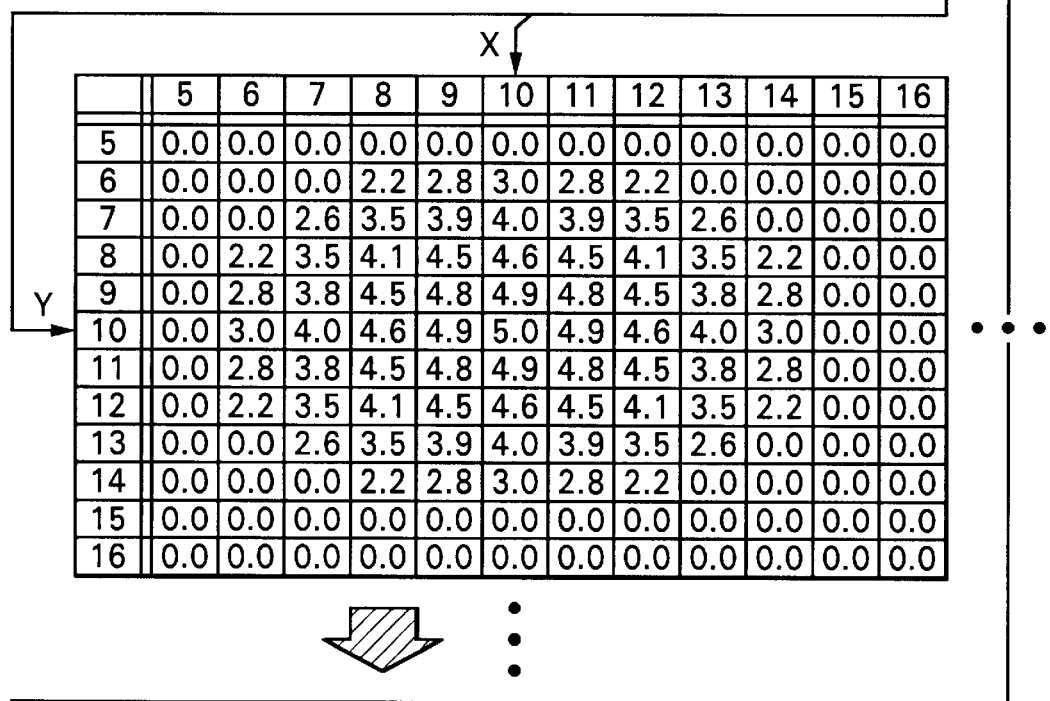
Figure 6:
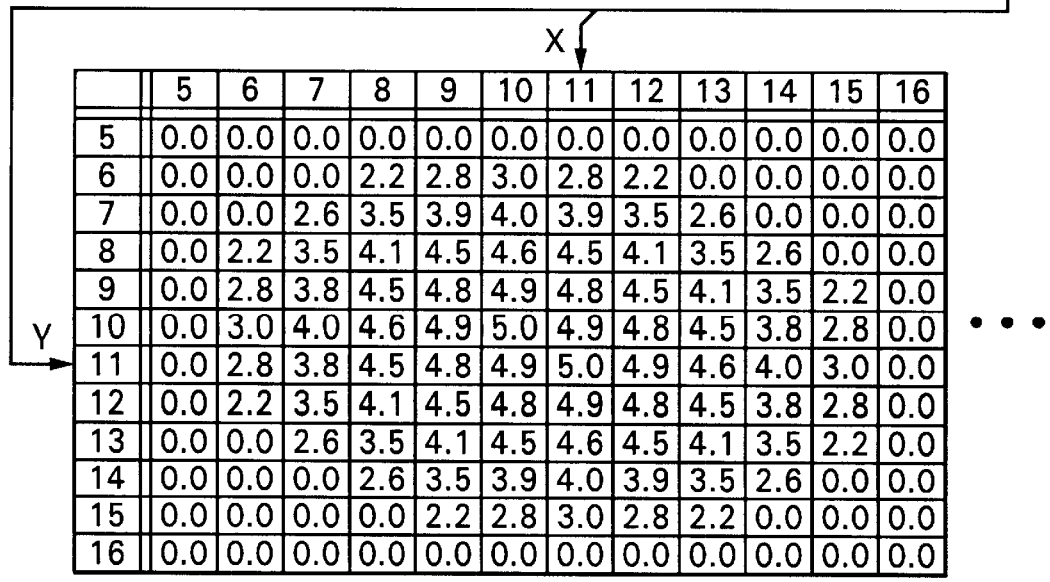

FIG. 6 shows the progress of finding such cumulative totals with regard to a hemisphere whose line segments begin at the initial point (10, 10) and end at the terminal point (15, 18) and whose radius is 5.0. According to FIG. 6, an evaluation is first made at the point (10, 10), and an evaluation at the next point (11, 11) is added to the first evaluation. Similarly, evaluations are added up with regard to the point sequence (11, 12), (12, 13), . . . (15, 18).

Figure 7:
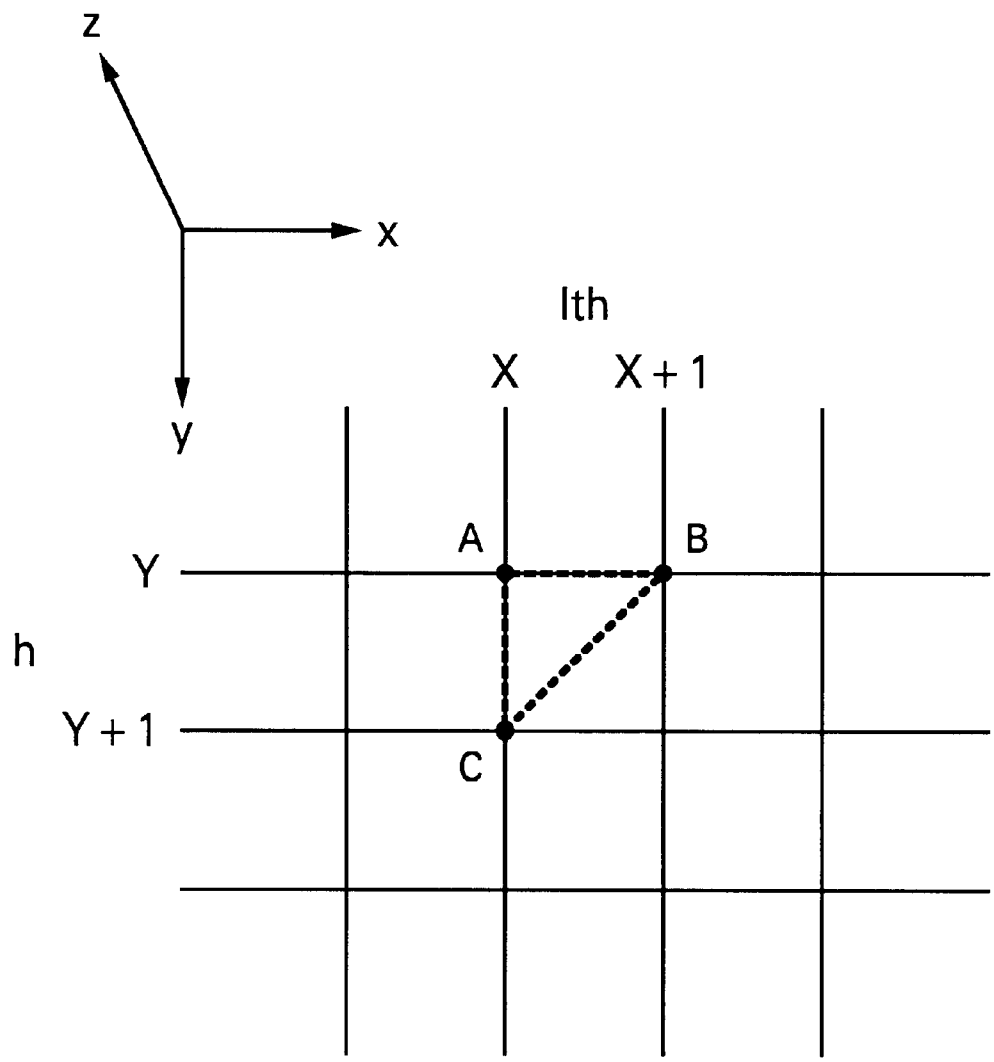
FIG. 7 illustrates how to determine the normal vectors of a texture surface.

The intensity computation block 4 is a module that visualizes generated texture data. In computing the intensity of texture, it is necessary to determine the normal vectors of the texture surface in question. Each normal vector of the texture surface is determined according to the bump attribute on the texture buffer, as shown in FIG. 7. The normal vector at point A ((i, j)-th) shall correspond to a normal to the plane of the triangle ABC formed by connecting point A ((i, j)-th), point B ((i+1, j)-th) to the right of point A, and point C ((i, j+1)-th) under point A to one another. Letting the coordinates of points A, B, and C be (x, y, za), (x+1, y, zb), and (x, y+1, zc) respectively, the normal vector (L, M, N) of the triangle ABC is obtained by solving the simultaneous equations (1) below:

$$L \cdot x + M \cdot y + N \cdot za + D = 0$$
$$L(x+1) + M \cdot y + N \cdot zb + D = 0$$
$$L \cdot x + M(y+1) + N \cdot zc + D = 0 \qquad (1)$$

Thus, (L, M, N)=(za−zb, za−zc, 1.0) is obtained. Intensity information is determined by applying the conventional shading technique to the normal vectors thus obtained.

As has been described so far, this invention enables texture information to be generated by combining the generation of line segments and the modeling of the line segments. Since line segments can be defined simply by position information only, without being given as mathematical functions, even complex line segments may be adopted for modeling by providing position information on line segments and by use of tablet or the like. Also, preview may be performed by use of line segments before modeling.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of generating a texture for a plurality of positions within a coordinate range, consisting of the steps of:

generating, in response to a plurality of line segments, a plurality of line coordinates within the coordinate range, the plurality of line segments including line segments in differing planes to provide a three-dimensional appearance;

generating, in response to said line coordinates, a position value for each position within the coordinate range; and generating, in response to each position value, a texture value for each position within the coordinate range.

2. The method of claim 1 further comprising a step of displaying said texture values.

3. The method of claim 1 wherein the step of generating texture values includes accumulating a plurality of position values for each of said plurality of positions.

4. The method of claim 3 further comprising a step of generating said line segments from hand-written input.

5. The method of claim 3 further comprising a step of generating said line segments from mathematical functions.

6. An apparatus for generating a texture for a plurality of positions within a coordinate range, consisting of:

means for generating a plurality of line points within the coordinate range, each line point being located on at least one line segment, the plurality of line points including line points in differing planes to provide a three-dimensional appearance;

means for generating, for each of said line points, a position value corresponding to each of said plurality of positions within the coordinate range; and means for generating a texture value for each of said plurality of positions within the coordinate range by surface rendering surface color information based on position values generated for each position.

7. The apparatus of claim 6 further comprising means for displaying said texture values.

8. The apparatus of claim 6 wherein the means for generating texture values includes means for accumulating a plurality of position values for each of said plurality of positions.

9. The apparatus of claim 8 further comprising means for generating said line segments from hand-written input.

10. The apparatus of claim 8 further comprising means for generating said line segments from mathematical functions.

* * * * *